(12) United States Patent
Sherrer et al.

(10) Patent No.: US 7,079,725 B2
(45) Date of Patent: Jul. 18, 2006

(54) OPTICAL SWITCH ASSEMBLY WITH FLEX PLATE AND METHOD FOR MAKING

(75) Inventors: David W. Sherrer, Blacksburg, VA (US); John Fisher, Blacksburg, VA (US)

(73) Assignee: Shipley Company, L.L.C., Marlborough, MA (US)

( * ) Notice: Subject to any disclaimer, the term of this patent is extended or adjusted under 35 U.S.C. 154(b) by 0 days.

(21) Appl. No.: 10/954,467

(22) Filed: Sep. 30, 2004

(65) Prior Publication Data

US 2005/0074201 A1   Apr. 7, 2005

Related U.S. Application Data

(62) Division of application No. 10/022,726, filed on Dec. 20, 2001, now Pat. No. 6,810,162.

(60) Provisional application No. 60/257,020, filed on Dec. 20, 2000.

(51) Int. Cl.
    *G02B 6/35* (2006.01)
(52) U.S. Cl. .............................. 385/16; 385/50; 385/52
(58) Field of Classification Search ............ 385/16–23, 385/50, 52, 136, 137
    See application file for complete search history.

(56) References Cited

U.S. PATENT DOCUMENTS

| | | |
|---|---|---|
| 3,864,018 A | 2/1975 | Miller |
| 4,120,923 A | 10/1978 | Kloker et al. |
| 4,150,870 A | 4/1979 | d'Auria |
| 4,165,496 A | 8/1979 | Di Domenico, Jr. et al. |
| 4,176,908 A | 12/1979 | Wagner |
| 4,210,923 A | 7/1980 | North et al. |
| 4,225,213 A | 9/1980 | McBride, Jr. et al. |
| 4,296,995 A | 10/1981 | Bickel |
| 4,325,604 A | 4/1982 | Witte |
| 4,407,562 A | 10/1983 | Young |
| 4,415,229 A | 11/1983 | McCullough |
| 4,498,730 A | 2/1985 | Tanaka et al. |
| 4,639,074 A | 1/1987 | Murphy |
| 4,699,457 A | 10/1987 | Goodman |
| 4,725,114 A | 2/1988 | Murphy |
| 4,756,590 A | 7/1988 | Forrest et al. |
| 4,859,022 A | 8/1989 | Opdahl et al. |
| 4,900,118 A | 2/1990 | Yanagawa et al. |
| 4,932,745 A | 6/1990 | Blonder |
| 4,973,127 A | 11/1990 | Cannon, Jr. et al. |
| 5,044,711 A | 9/1991 | Saito |
| 5,123,073 A | 6/1992 | Pimpinella |
| 5,127,084 A | 6/1992 | Takahashi |

(Continued)

FOREIGN PATENT DOCUMENTS

DE   39 27 441 A1   2/1991

(Continued)

*Primary Examiner*—John D. Lee
*Assistant Examiner*—Omar Rojas
(74) *Attorney, Agent, or Firm*—Jonathan D. Baskin

(57) ABSTRACT

An optical switch and method for assembling are described. Optical arrays are mounted on a flex plate with an interface between them. The direction of certain forces on the flex plate allows coupling/decoupling of the optical arrays. The flex plate includes an area which exhibits a different flex profile than the remainder of the flex plate and that is located beneath the optical arrays interface. Flexing of the flex plate optically couples the optical arrays. A tool with grooves is used to align the optical arrays relative to each other. The tool uses grooves and spheres to mate with the optical arrays in such a way as to provide an appropriate interface between the optical arrays.

11 Claims, 7 Drawing Sheets

U.S. PATENT DOCUMENTS

| | | |
|---|---|---|
| 5,135,590 A | 8/1992 | Basavanhaly et al. |
| 5,177,804 A | 1/1993 | Shimizu et al. |
| 5,179,609 A | 1/1993 | Blonder et al. |
| 5,181,216 A | 1/1993 | Ackerman et al. |
| 5,185,825 A | 2/1993 | Shigematsu et al. |
| 5,185,846 A | 2/1993 | Basavanhally et al. |
| 5,187,758 A | 2/1993 | Ueda et al. |
| 5,257,332 A | 10/1993 | Pimpinella |
| 5,297,228 A | 3/1994 | Yanagawa et al. |
| 5,337,384 A | 8/1994 | Basavanhally et al. |
| 5,343,548 A * | 8/1994 | Hall et al. .................. 385/89 |
| 5,357,590 A | 10/1994 | Auracher |
| 5,379,361 A | 1/1995 | Maekawa et al. |
| 5,390,266 A | 2/1995 | Heitmann et al. |
| 5,440,655 A | 8/1995 | Kaplow et al. |
| 5,461,683 A | 10/1995 | Harman |
| 5,483,608 A | 1/1996 | Yokomachi et al. |
| 5,499,309 A | 3/1996 | Kozuka et al. |
| 5,500,910 A | 3/1996 | Boudreau et al. |
| 5,500,911 A | 3/1996 | Roff |
| 5,555,333 A | 9/1996 | Kato |
| 5,566,262 A | 10/1996 | Yamane et al. |
| 5,568,585 A | 10/1996 | Kramer |
| 5,602,951 A | 2/1997 | Shiota et al. |
| 5,611,006 A | 3/1997 | Tabuchi |
| 5,623,564 A | 4/1997 | Presby |
| 5,699,463 A | 12/1997 | Yang et al. |
| 5,727,099 A | 3/1998 | Harman |
| 5,732,167 A | 3/1998 | Ishiko et al. |
| 5,757,991 A | 5/1998 | Harman |
| 5,778,123 A | 7/1998 | Hagan et al. |
| 5,785,825 A | 7/1998 | Hwang et al. |
| 5,828,800 A | 10/1998 | Henry et al. |
| 5,901,262 A | 5/1999 | Kobayashi et al. |
| 5,909,524 A | 6/1999 | Tabuchi |
| 5,920,665 A | 7/1999 | Presby |
| 6,045,270 A | 4/2000 | Weiss et al. |
| 6,056,696 A | 5/2000 | Kallman |
| 6,064,781 A | 5/2000 | Seibold et al. |
| 6,086,704 A | 7/2000 | Kanai et al. |
| 6,101,299 A | 8/2000 | Laor |
| 6,118,917 A | 9/2000 | Lee et al. |
| 6,160,936 A | 12/2000 | You et al. |
| 6,234,687 B1 | 5/2001 | Hall et al. |
| 6,320,997 B1 | 11/2001 | Dautartas et al. |
| 6,328,479 B1 | 12/2001 | Schofield et al. |
| 6,393,174 B1 | 5/2002 | Karaguleff et al. |
| 6,393,175 B1 | 5/2002 | Jurbergs et al. |
| 6,477,303 B1 | 11/2002 | Witherspoon |
| 6,519,382 B1 | 2/2003 | Jurbergs et al. |
| 6,625,356 B1 | 9/2003 | Ticknor et al. |
| 6,748,131 B1 * | 6/2004 | Steinberg et al. ............. 385/20 |
| 2001/0041026 A1 | 11/2001 | Steinberg et al. |
| 2001/0048785 A1 | 12/2001 | Steinberg |
| 2002/0025104 A1 | 2/2002 | Steinberg et al. |
| 2002/0025107 A1 | 2/2002 | Heiks et al. |
| 2002/0028037 A1 | 3/2002 | Steinberg et al. |
| 2002/0146194 A1 | 10/2002 | Sherrer et al. |
| 2002/0181854 A1 | 12/2002 | Steinberg et al. |
| 2003/0108272 A1 | 6/2003 | Sherrer et al. |

FOREIGN PATENT DOCUMENTS

| | | |
|---|---|---|
| EP | 000476241 A2 | 3/1992 |
| JP | 363085522 A | 4/1988 |
| JP | 02186308 A * | 7/1990 |
| JP | 1999305151 A | 11/1999 |

\* cited by examiner

FIG. 11
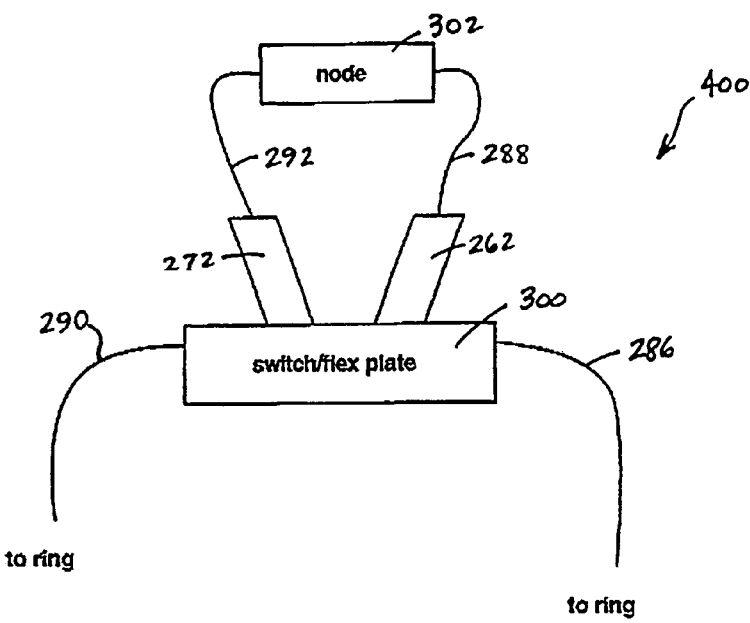
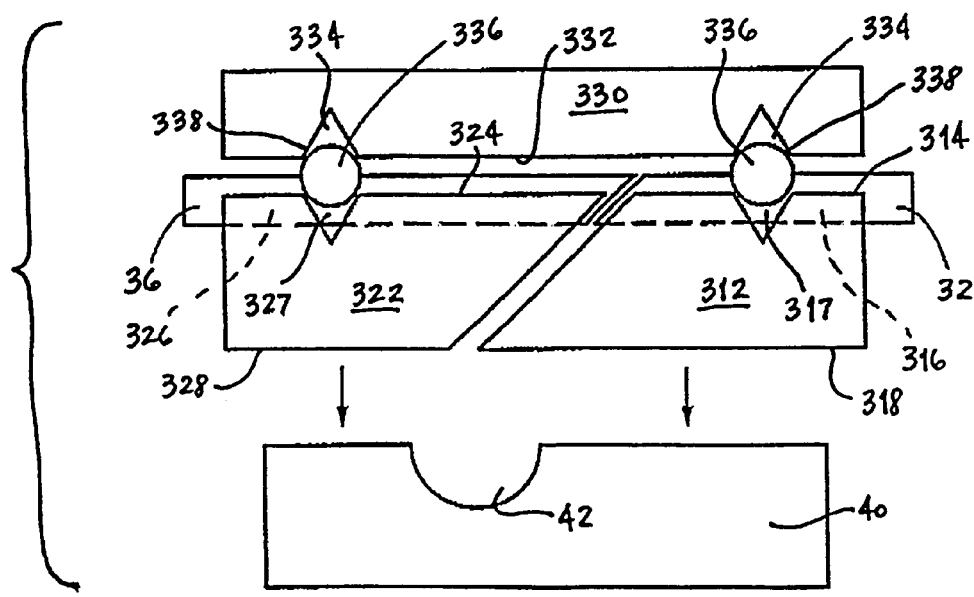
FIG. 12

OPTICAL SWITCH ASSEMBLY WITH FLEX PLATE AND METHOD FOR MAKING

This is a divisional application of U.S. application Ser. No. 10/022,726 filed Dec. 20, 2001 now U.S. Pat. No. 6,810,162 which claims priority from provisional application Ser. No. 60/257,020 filed Dec. 20, 2000, such applications being incorporated herein by reference.

FIELD OF THE INVENTION

The present invention related to a frustrated total internal reflection/total internal reflection (FTIR/TIR) optical fiber switch.

BACKGROUND

Conventional frustrated total internal reflection/total internal reflection optical fiber switches operate by displacing at least one of the fibers to contact, or come within less than a micron from contact with, the other fiber (closed position) or to release contact with the other fiber (opened position). Generally, the optical fibers connect one another at ends which are formed transverse to the longitudinal axis of the fibers and coplanar to one another. In the closed position, input light is transmitted from one optical fiber to the other with little or no transmission loss. In the opened position, in which a gap exists of greater than one micron between the optical fibers, input light is reflected from one of the fibers, leading to complete or partial transmission loss. Complete transmission loss occurs during total internal reflection, when light approaches a dielectric interface at or above a critical angle and is thereby suppressed from being transmitted to the other optical fiber. When the angle is below the critical angle, or the distance between the optical fibers is sufficiently small, some input light may cross the gap between the optical fibers and thereby frustrate the total internal reflection. An example of such a conventional optical switch is described in U.S. Pat. Nos. 5,390,266 and 4,176,908.

SUMMARY

The invention provides an optical switch that includes first and second optical arrays separated by an interface, and a support structure upon which the optical arrays are mounted. The support structure includes an area which has a flexing profile that differs from the remainder of the support structure such that upon the operation of force on the support structure the optical arrays are optically coupled or decoupled.

The invention also provides an optical switch that includes first, second, third, fourth and fifth optical arrays and a support structure upon which the first, second and third optical arrays are mounted. The third optical array is interposed between the first and second optical arrays, the first and third optical arrays are separated by a first interface, and the second and third optical arrays are separated by a second interface. The support structure includes a pair of areas which each have a flexing profile that differs from the remainder of the support structure. The fourth optical array is positioned transverse to the first and third optical arrays in the vicinity of the first interface and the fifth optical array is positioned transverse to the second and third optical arrays in the vicinity of the second interface.

The invention further provides a method for assembling an optical switch. The method includes aligning at least a first optical array and a second optical array relative to one another with an alignment tool, positioning the at least first and second optical arrays on a support structure, immobilizing the at least first and second optical arrays relative to the support structure, and removing the tool from the at least first and second optical arrays.

The foregoing and other advantages and features of the invention will be more readily understood from the following detailed description of the invention, which is provided in connection with the accompanying drawings.

BRIEF DESCRIPTION OF THE DRAWINGS

FIG. 11 is a schematic drawing of an optical system utilizing the optical switch assembly of FIG. 7 in accordance with another embodiment of the invention.

FIGS. 12–13 are side views showing the assembly of an optical switch assembly in accordance with another embodiment of the invention.

DETAILED DESCRIPTION OF THE PREFERRED EMBODIMENTS

Figure 1:
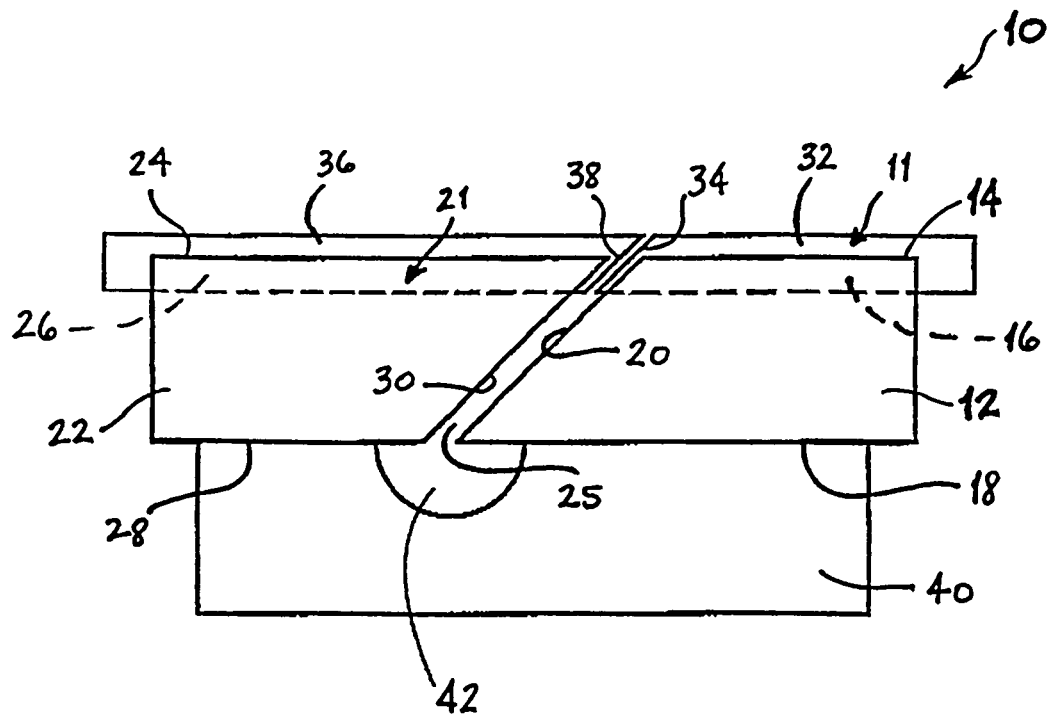
FIGS. 1–3 is a side view of an optical switch assembly constructed in accordance with an embodiment of the invention.

Referring to FIGS. 1–4, in which like numerals designate like elements, an optical FTIR/TIR switch assembly 10 is shown including a first angled optical array 11, a second angled optical array 21, and a flexible support structure, such as a flex plate 40. The first optical array 11 includes a support structure, such as a chip 12, that has a face 20 and first and second surfaces 14, 18. The first surface 14 includes at least one first surface groove 16. The second optical array 21 includes a support structure, such as a chip 22, that has a face 30 and first and second surfaces 24, 28. The first surface 24 has at least one first surface groove 26. The chips 12, 22 are preferably formed of silicon.

The flex plate 40 includes a trench 42 which is preferably formed through isotropic etching. Each of the optical arrays 11, 21 is mounted on the flex plate 40, which is preferably formed of single crystal silicon, such that there is an interface 25 (e.g., a gap) between the faces 20, 30 and such that the interface 25 is positioned above the trench 42. The first and second arrays 11, 21 are positioned and adhered to the flex plate 40. Preferably an adhering material is utilized to immobilize the first and second arrays 11, 21.

Upon each of the optical arrays 11, 21 are mounted one or more optical fibers, which are preferably formed of silica. As shown, an optical fiber 32 is mounted within the groove 16 of the chip 12, and a corresponding optical fiber 36 is mounted within the groove 26 of the chip 22. The optical fibers 32, 36 have endfaces 34, 38, respectively, that are angled at an angle greater than a total internal reflection angle of the optical fiber material. The optical fibers 32, 36 may be adhered to the grooves 16, 26 through the use of an adhering material or mechanism (not shown). Any suitable adhering material or mechanism may be used, such as, for example, ultraviolet curable epoxy, solder, aluminum-oxide direct thermal compression bonding, or sol-gel or spin-on glass.

Figure 2:
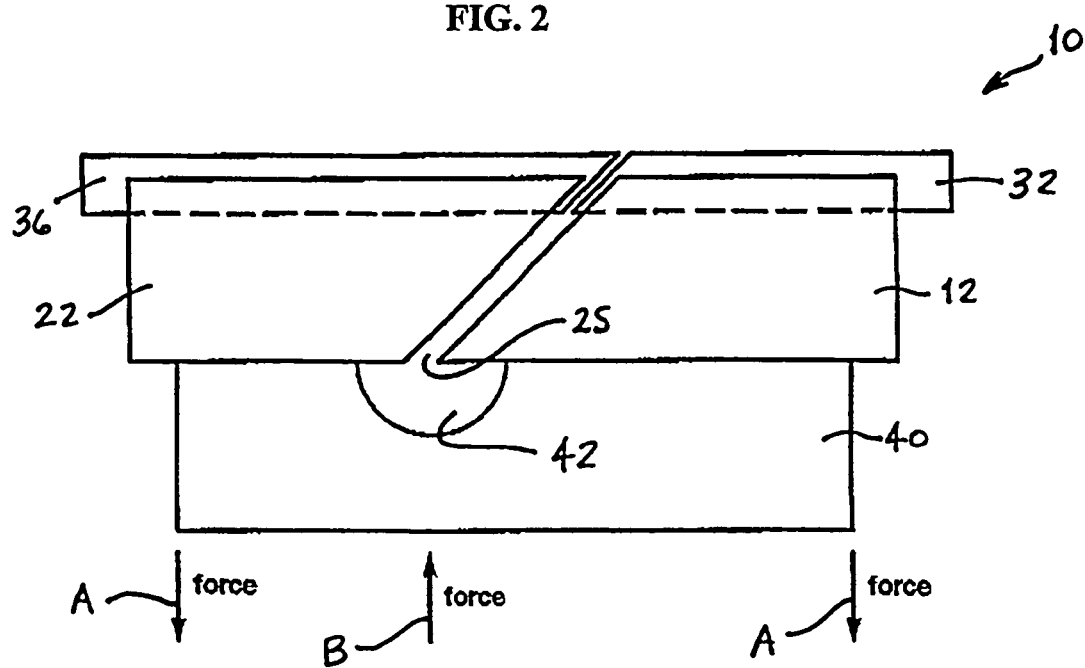
Figure 3:
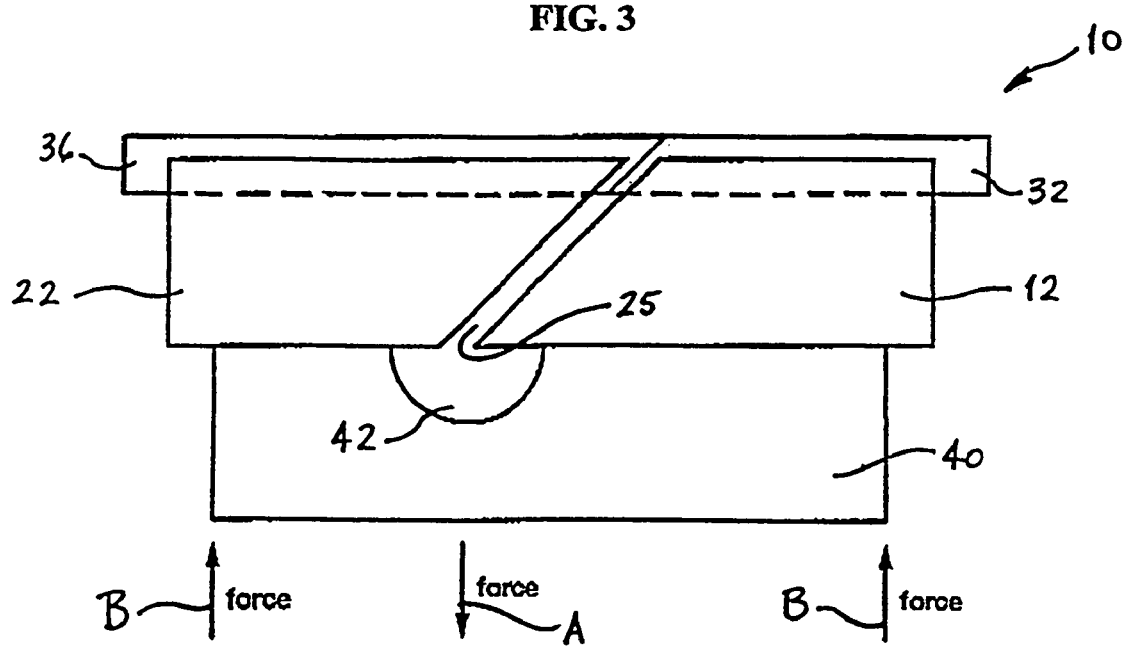

The optical switch assembly 10 is shown in FIGS. 2–3 in, respectively, an opened and a closed state. In FIG. 2, forces are directed upon the flex plate 40 at certain locations. Specifically, a force in a direction B is directed toward the flex plate 40 generally near the trench 42. Further, forces in a direction A are directed away from the flex plate 40 at ends of the flex plate 40. The forces tend to allow the flex plate 40 to flex such that its ends move generally in direction A. Since the chips 12, 22 are mounted on the flex plate 40, such movement results in the endfaces 34 and 38 of the optical fibers 32, 36 moving apart from one another, thus opening the optical switch assembly 10.

FIG. 3 illustrates the optical switch assembly 10 in the closed position. As shown, force is directed away from the flex plate 40 in the direction A in the general vicinity of the trench 42, while forces are directed toward the flex plate 40 at its ends in the direction B. Through this arrangement of forces, the flex plate 40 tends to push the endfaces 34, 38 together, thereby closing the optical switch assembly 10.

Figure 4:
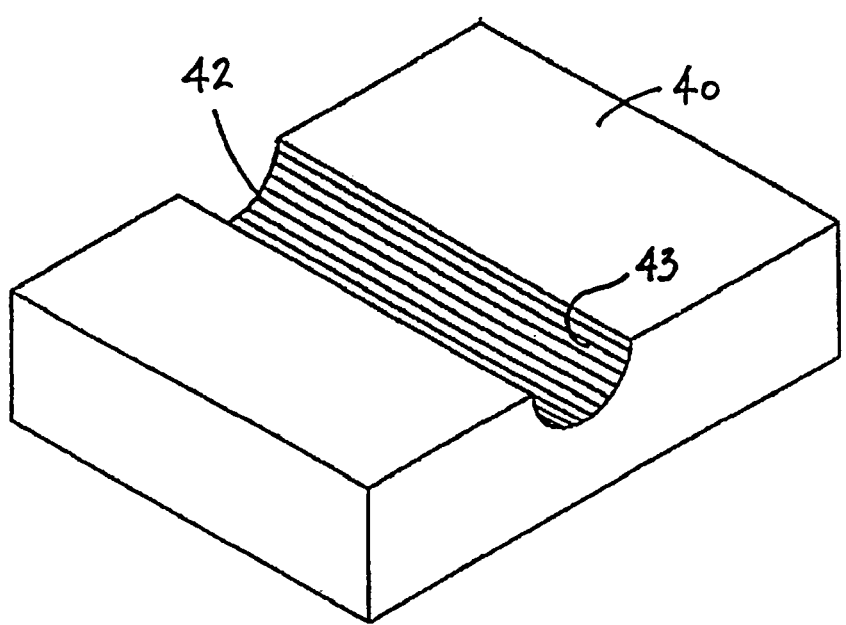
FIG. 4 is a perspective view of the flex plate of the optical switch assembly of FIG. 1.

As noted above, the trench 42 of the flex plate 40 is preferably isotropically etched. The trench 42 should preferably extend across the flex plate as shown in FIG. 4. It is preferred that the trench 42 has a smooth sidewall 43 to prevent any localized mechanical stress during the previously described flexing operations. It is to be understood that a suitable flex plate 40 includes an area, such as the trench 42 or any other similar structure, that has a different flexing capability or profile relative to the remaining portion of the flex plate 40.

Figure 5:
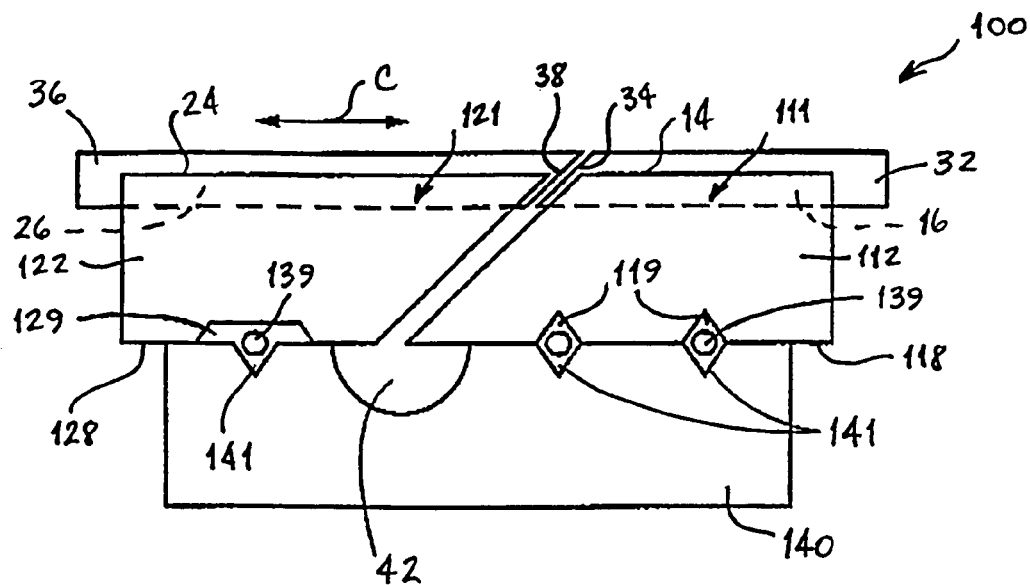
FIG. 5 is a side view of an optical switch assembly constructed in accordance with another embodiment of the invention.

FIG. 5 illustrates another aspect of the invention with reference to an optical switch assembly 100 which includes a first optical array 111 and a second optical array 121 positioned on a flex plate 140. The optical arrays 111, 121 are each mounted on spheres 139. Specifically, the first optical array 111 has a second surface 118 including one or more grooves 119 and the second optical array 121 has a second surface 128 having at least one groove 129. The flex plate 140 also has a plurality of grooves 141 on an upper surface thereof which mate with the grooves 119, 129. Spheres 139 seat within the grooves 141. As shown, the groove 129 is elongated relative to the grooves 141. Elongation of the groove 129 relative to its mating groove 141 allows the second optical array 121 to move in a direction C relative to the first optical array 111 during assembly, thus allowing adjustment of the gap between the endfaces 34, 38. Once the gap has been properly adjusted, the optical arrays 111, 121 are then immobilized relative to the flex plate 140. Preferably, the grooves 119, 129, 141 are anisotropically wet etched with potassium hydroxide or other suitable etchant material.

Figure 6:
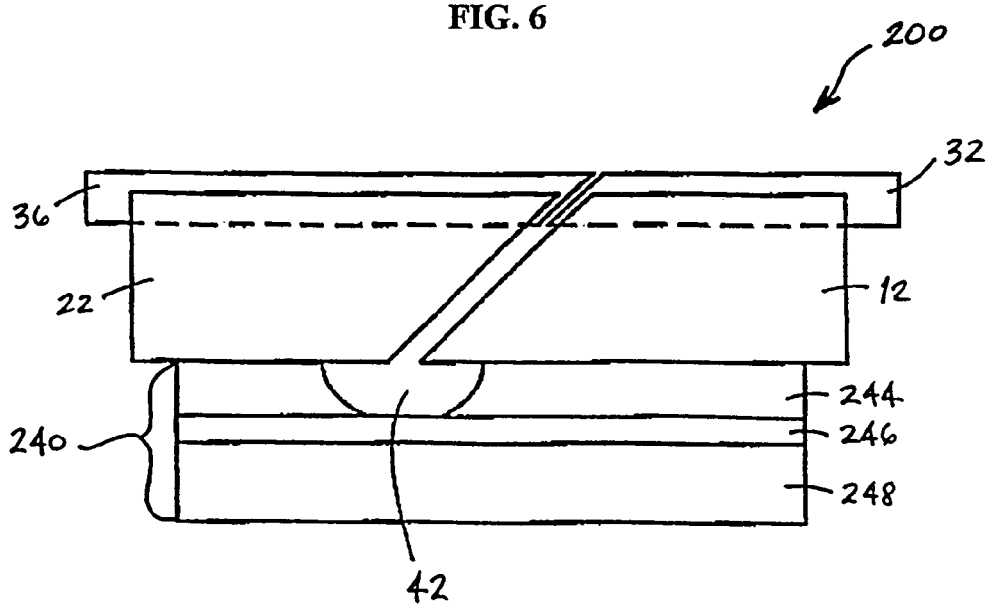
FIG. 6 is a side view of an optical switch assembly constructed in accordance with another embodiment of the invention.

FIG. 6 illustrates another optical switch assembly 200, which includes the first optical array 12, the second optical array 22, and a flex plate 240. The flex plate 240 is a silicon-on-insulator (SOI) wafer which includes a pair of silicon layers 244, 248 sandwiching an insulator layer 246. The trench 42 is isotropically etched in the silicon layer 244 by etchant materials. The insulator layer 246 is preferably formed of a material which is resistant to the etchant materials used to etch the silicon layer 244. The proper depth of the trench 42 is obtained by the position of the insulator layer 246, which suppresses etching of the trench 42.

Figure 7:
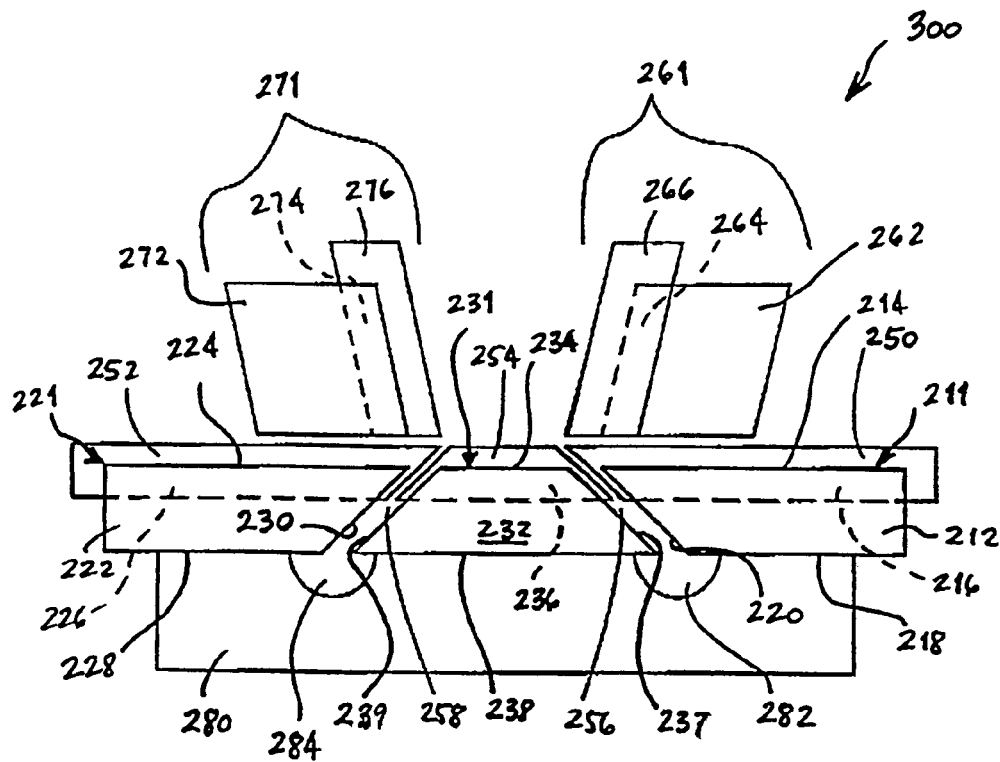
FIGS. 7–9 is a side view of an optical switch assembly constructed in accordance with another embodiment of the invention.
Figure 8:
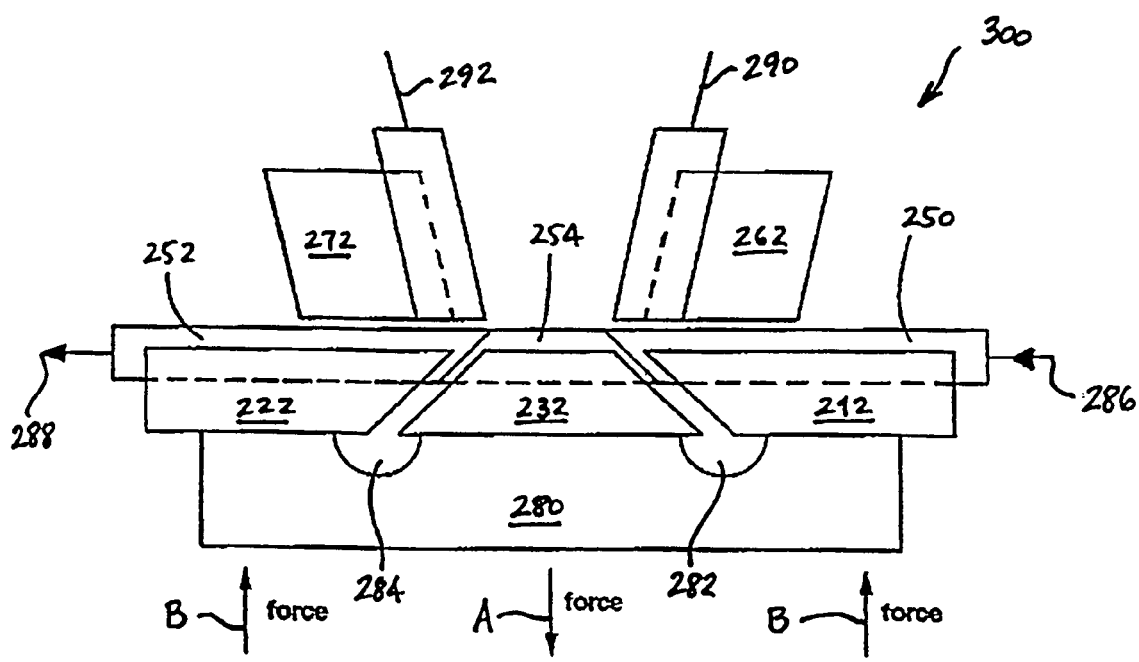
Figure 9:
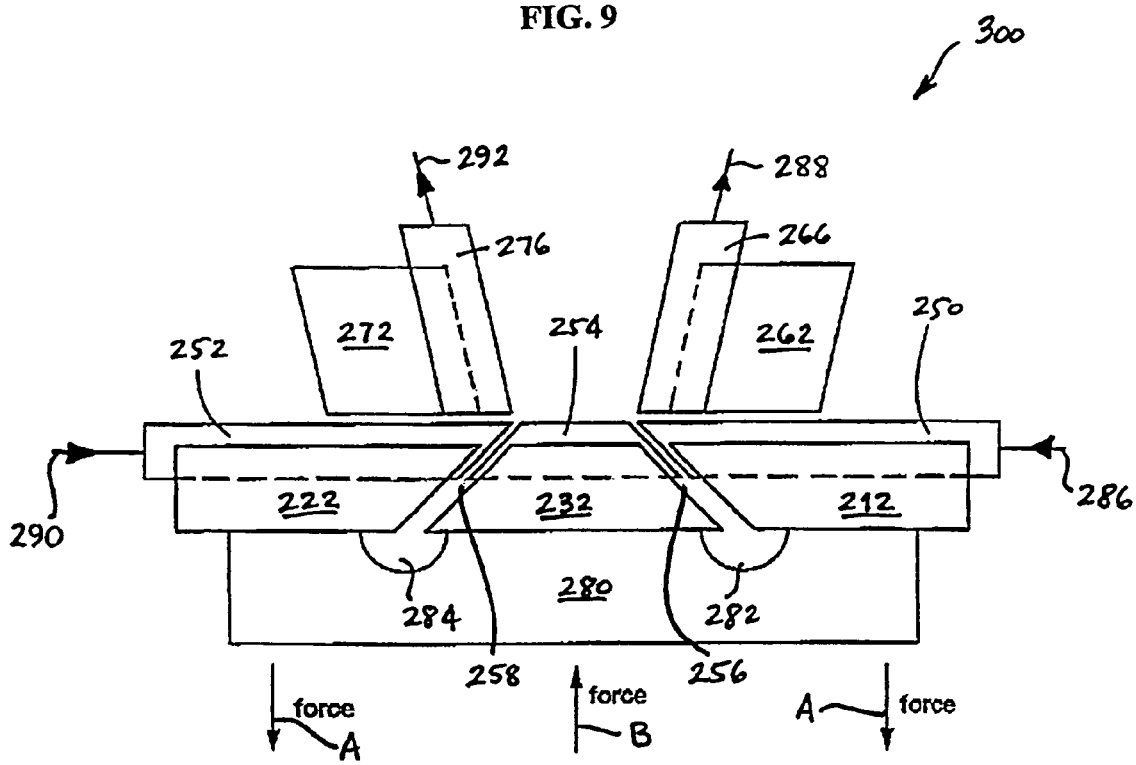

With reference to FIGS. 7–9, another aspect of the invention is shown with reference to an optical switch 300 which includes a first optical array 211, a second optical array 221, a third optical array 231, a fourth optical array 261, a fifth optical array 271, and a flex plate 280. The first optical array 211 includes a chip 212, which has a first surface 214, a second surface 218, and a face 220. The second optical array 221 includes a chip 222, which has a first surface 224, a second surface 228, and a face 230. The third optical array 231 is positioned between the first and second optical arrays 211, 221, and includes a chip 232, which has a first surface 234, a second surface 238, and a pair of faces 237, 239. The face 237 mates with the face 220 of the first optical array 211, while the face 239 mates with the face 230 of the second optical array 221.

The first surfaces 214, 224, 234 each include at least one groove 216, 226, 236, respectively. An optical fiber 250 is positioned within the groove 216, an optical fiber 252 is positioned within the groove 226, and an optical fiber 254 is positioned within the groove 236. There is an interface 256 that extends between the face 237 of the chip 232 and the endface of its respective optical fiber 254 and the face 220 of the chip 212 and the endface of its respective optical fiber 250. Further, there is an interface 258 that extends between the face 239 of the chip 232 and the endface of optical fiber 254 and the face 230 of the chip 222 and the endface of its respective optical fiber 252.

The fourth and fifth optical arrays 261 and 271 are on-edge optical arrays which collect light which has been reflected from the interfaces 256, 258. The fourth optical array 261 includes a chip 262, having a groove 264, and an optical fiber 266. The fifth optical array 271 includes a chip 272, having a groove 274, and an optical fiber 276. The fourth optical array 261 is positioned transverse to the alignment of the first, second and third optical arrays 211, 221, 231 and generally in the vicinity of the interface 256. The fifth optical array 271 is positioned transverse to the alignment of the first, second and third optical arrays 211, 221, 231 and generally in the vicinity of the interface 258.

The flex plate 280 includes a pair of etched trenches 282, 284. Each of the trenches 282, 284 is positioned beneath one of the interfaces 256, 258. With specific reference to FIG. 8, by directing a force in the direction A away from the flex plate 280 in the general vicinity of the third optical array 232, and by concurrently directing forces in the direction B toward the flex plate 280 at its edges, light which is input from a light source 286 is transmitted along the optical fibers 250, 254, and 252 to an output destination 288. If instead, as shown in FIG. 9, a force is directed in the direction B toward the flex plate 280 in the general vicinity of the third optical array 232, and forces are directed away from the flex plate 280 in the direction A at the plate's 280 edges, the interfaces 256, 258 are misaligned to such an extent as to suppress light from being transmitted through the optical fibers 250, 254, and 252. Instead, light from the light source 286 may be sent through the optical fiber 250, reflected at the gap between the optical fiber 250 and the optical fiber 254, collected by the optical fiber 266, and transmitted to the output destination 288. In addition, light from a second light source 290 concurrently may be sent through the optical fiber 252, reflected at the gap between the optical fiber 252 and the optical fiber 254, collected by the optical fiber 276, and transmitted to a second output destination 292.

Figure 10:
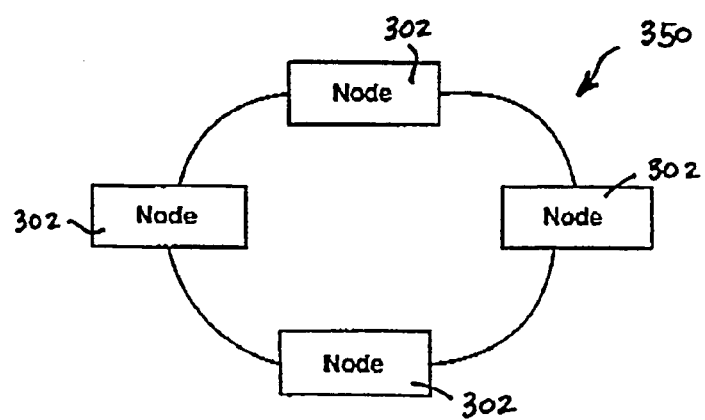
FIG. 10 is a schematic drawing of a conventional optical system.

The optical switch assembly 300 is particularly useful for ring networks in which a switch must be continuously connected and disconnected from a data ring. A conventional ring network 350, shown in FIG. 10, includes a plurality of nodes 302 in communication with each other. FIG. 11 illustrates the inclusion of the optical switch assembly 300 in a data ring 400. Light from a light source 286 which is within the data ring 400 is transmitted to the optical switch 300 and reflected into the optical array 262 and sent to the output destination 288, which in this instance is one of the nodes 302. Further, light from a light source 290 which is within the data ring 400 also is transmitted to the optical switch 300, reflected into the optical array 272 and sent to the output destination 292, which in this instance is the same node 302.

Figure 13:
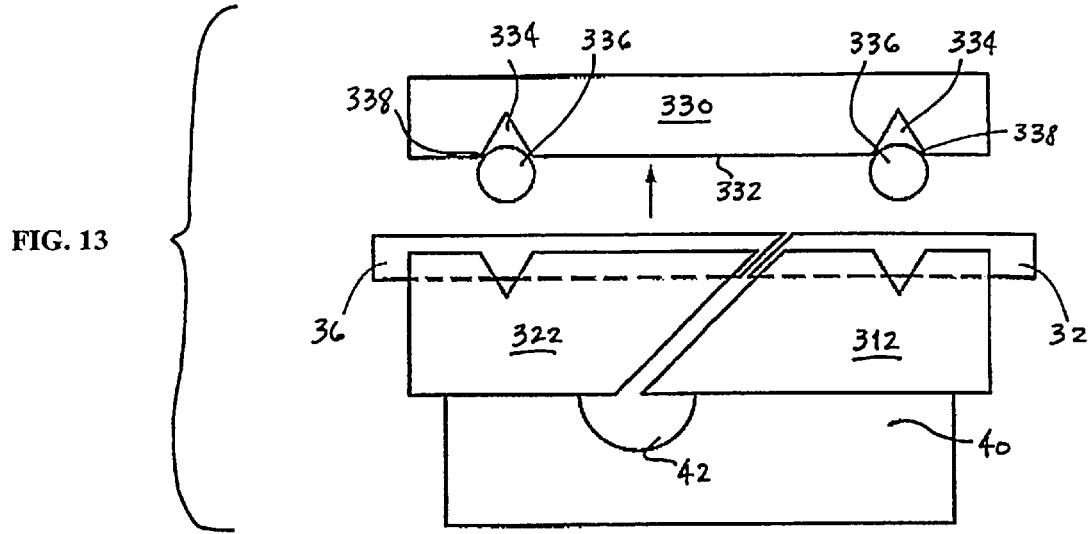

With reference to FIGS. 12–13, next will be described a method of assembling an optical switch assembly in accordance with an embodiment of the invention. The optical switch assembly shown in FIGS. 12–13 includes a first optical array 312 and a second optical array 322. The first optical array 312 includes a first surface 314 and a second surface 318. At least one groove 316 is located in the first surface 314, and at least one pit 317 is also located in the first surface 314. The second optical array 322 includes a first surface 324 and a second surface 328. At least one groove 326 is located in the first surface 324, and at least one pit 327 is further located in the first surface 324. The second surfaces 318, 328 are to be mounted on the flex plate 40.

A tool 330, having at least a pair of pits 334 in a first surface 332 is used to align the first optical array 312 relative to the second optical array 322. Spheres 336 are positioned within the pits 334 and the optical arrays 312, 322 are moved so that the spheres 336 concurrently fit within the pits 317, 327, thereby adjusting the position of the first optical array 312 with respect to the second optical array 322. The spheres 336 may be adhered to the pits 334 with an adhesive material 338. Once proper position has been obtained, the optical arrays 312, 322 are immobilized relative to the flex plate 40 and the tool 330 is removed.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, although the flex plate 40 has been shown to have a semicircularly-shaped trench 42, it should be understood that the trench may be any suitable shape capable of localizing the flexing potential of the flex plate 40. Also, instead of a trench 42, the area with a different flex profile from the remainder of the flex plate 40 may be formed with a hinge or biasing member or other suitable mechanism. Further, while the tool 330 has been illustrated to show alignment of one optical array with another, it is to be understood that the tool 330 may be modified to align three optical arrays, such as optical arrays 211, 221, 231 shown in FIG. 7, and the remaining optical arrays 261 and 271 may be separately aligned. Accordingly, the invention is not to be seen as limited by the foregoing description, but is only limited by the scope of the appended claims.

What is claimed as new and desired to be protected by Letters Patent of the United States is:

1. A method for assembling an optical switch, comprising:
aligning at least a first optical fiber array and a second optical fiber array relative to one another with an alignment tool;
positioning said at least first and second optical fiber arrays on a support structure, wherein said positioning comprises locating on said support structure said at least first and second optical fiber arrays with an interface therebetween, wherein said locating is such that upon certain forces directed in certain directions and at certain locations of said support structure said interface is lessened and said at least first and second optical fiber arrays are optically coupled;
immobilizing said at least first and second optical fiber arrays relative to said support structure; and
removing said tool from said at least first and second optical fiber arrays.

2. The method of claim 1, wherein said aligning comprises:
mating at least a first groove on said tool with at least a first groove on said first optical fiber array;
mating at least a second groove on said tool with at least a second groove on said second optical fiber array; and
positioning a sphere within said mated first grooves and positioning a sphere within said mated second grooves.

3. The method of claim 1, wherein said immobilizing comprises adhering said at least first and second optical fiber arrays to said support structure.

4. A method for assembling an optical switch, comprising:
aligning at least a first optical fiber array and a second optical fiber array relative to one another with an alignment tool;
positioning said at least first and second optical fiber arrays on a support structure;
immunobilizing said at least first and second optical fiber arrays relative to said support structure; and
removing said tool from said at least first and second optical fiber arrays,
wherein said aligning comprises aligning said first and second optical fiber arrays relative to a third optical fiber array, said third optical fiber array being interposed between said first and second optical fiber arrays.

5. The method of claim 4, wherein said positioning comprises locating on said support structure said first, second and third optical fiber arrays with a first interface between said first and third optical fiber arrays and a second interface between said second and third optical fiber arrays.

6. The method of claim 5, wherein said locating is such that upon certain forces directed in certain directions and at certain locations of said support structure, said first and second interfaces are lessened and said at least first and second optical fiber arrays are optically coupled with said third optical fiber array.

7. The method of claim 4, wherein said immobilizing comprises adhering said first, second and third optical fiber arrays to said support structure.

8. A method for assembling an optical switch, comprising:
aligning at least a first optical array and a second optical array relative to one another with an alignment tool, said aligning comprising:
mating at least a first groove on said tool with at least a first groove on said first optical array;
mating at least a second groove on said tool with at least a second groove on said second optical array; and
positioning a sphere within said mated first grooves and positioning a sphere within said mated second grooves;
positioning said at least first and second optical arrays on a support structure;

immobilizing said at least first and second optical arrays relative to said support structure; and removing said tool from said at least first and second optical rays.

9. The method of claim 8, wherein said immobilizing comprises adhering said at least first and second optical arrays to said support structure.

10. A method for assembling an optical switch, comprising:

aligning at least a first optical array and a second optical array relative to one another with an alignment tool:

positioning said at least first and second optical arrays on a support structure, wherein said positioning comprises locating on said support structure said at least first and second optical arrays with an interface therebetween such that upon certain forces directed in certain directions and at certain locations of said support structure said interface is lessened and said at least first and second optical arrays are optically coupled;

immobilizing said at least first and second optical arrays relative to said support structure; and removing said tool from said at least first and second optical arrays.

11. The method of claim 10, wherein said immobilizing comprises adhering said at least first and second optical arrays to said support structure.

* * * * *